(12) United States Patent
Hunzinger

(10) Patent No.: US 7,054,614 B1
(45) Date of Patent: May 30, 2006

(54) CONTEXT PRIVACY FOR DELIVERY OF CONTEXT-AWARE CONTENT FOR WIRELESS TERMINALS

(75) Inventor: Jason F. Hunzinger, Carlsbad, CA (US)

(73) Assignee: DENSO Corporation, Kariya (JP)

( * ) Notice: Subject to any disclaimer, the term of this patent is extended or adjusted under 35 U.S.C. 154(b) by 606 days.

(21) Appl. No.: 09/924,208

(22) Filed: Aug. 7, 2001

Related U.S. Application Data

(60) Provisional application No. 60/223,131, filed on Aug. 7, 2000.

(51) Int. Cl.
*H04M 1/66* (2006.01)
(52) U.S. Cl. .................. 455/411; 455/420; 455/418
(58) Field of Classification Search ............... 455/411, 455/410, 412.1, 412.2, 412.3, 414.4, 418, 455/420, 414.1
See application file for complete search history.

(56) References Cited

U.S. PATENT DOCUMENTS

| | | | | |
|---|---|---|---|---|
| 5,754,939 A | * | 5/1998 | Herz et al. ................. | 455/3.04 |
| 6,094,573 A | * | 7/2000 | Heinonen et al. ......... | 455/412.1 |
| 6,560,456 B1 | * | 5/2003 | Lohtia et al. .............. | 455/445 |
| 6,625,457 B1 | * | 9/2003 | Raith ........................ | 455/456.1 |
| 6,647,257 B1 | * | 11/2003 | Owensby .................. | 455/414.1 |
| 6,731,238 B1 | * | 5/2004 | Johnson .................. | 342/357.09 |
| 6,731,940 B1 | * | 5/2004 | Nagendran ............... | 455/456.1 |

* cited by examiner

*Primary Examiner*—CongVan Tran
(74) *Attorney, Agent, or Firm*—Harness, Dickey & Pierce, PLC

(57) ABSTRACT

A mobile station in a wireless communication system monitors a plurality of contextual conditions with respect to its current conditions. The contextual conditions may define a characteristic, such as the location of the mobile station or a time frame. The mobile station may then run programs based on the satisfied contextual conditions. Instructions, content and context information can be distributed by a central database to the mobile station. Instructions and context descriptions may be generated in a way such that they encapsulate detection of context and execution of associated actions so that the context of the mobile station is kept private.

83 Claims, 3 Drawing Sheets

CONTEXT PRIVACY FOR DELIVERY OF CONTEXT-AWARE CONTENT FOR WIRELESS TERMINALS

CROSS-REFERENCE TO RELATED APPLICATIONS

This application claims benefit of U.S. Provisional application No. 60/223,131, filed Aug. 7, 2000, the content of which is herein incorporated by reference in its entirety.

TECHNICAL FIELD

This invention relates to wireless communication systems, and more particularly to providing delivery of context aware content and actions to handsets in wireless communication systems, while maintaining privacy with respect to each handset's particular context.

BACKGROUND

The desire to use information in wireless communication systems is constantly increasing. With the increased use of the wireless web on cellular telephones, the versatility and potential of the wireless communication systems is increasing. For example, cellular phones may execute programs when certain conditions are met. However, the desire to maintain privacy of the user needs to be balanced with the convenience of executing programs based on user data. What is desired is a means to manage the distribution of information and instructions to wireless terminals to minimize divulging private information through actions with entities external to the mobile station.

SUMMARY

A mobile station in a wireless communication system monitors a plurality of contextual conditions with respect to its current conditions. The contextual conditions may define a characteristic, such as the location of the mobile station or a time frame. Instructions, content and context information can be distributed by a central database to the mobile station. Instructions and context descriptions may be generated in a way such that they encapsulate detection of context and execution of associated actions so that the context of the mobile station is kept private. The mobile station monitors data to determine when the contextual conditions are satisfied. The mobile station may then run programs based on the satisfied contextual conditions. A server may generate, monitor, control the distribution of instructions and content and context information to terminals to perform such actions based on contextual conditions. A server distributes such information to minimize the amount or type of private information that wireless terminals will divulge when acting on those conditions.

DESCRIPTION OF DRAWINGS

These and other features and advantages of the invention will become more apparent upon reading the following detailed description and upon reference to the accompanying drawings.

DETAILED DESCRIPTION

Figure 1:
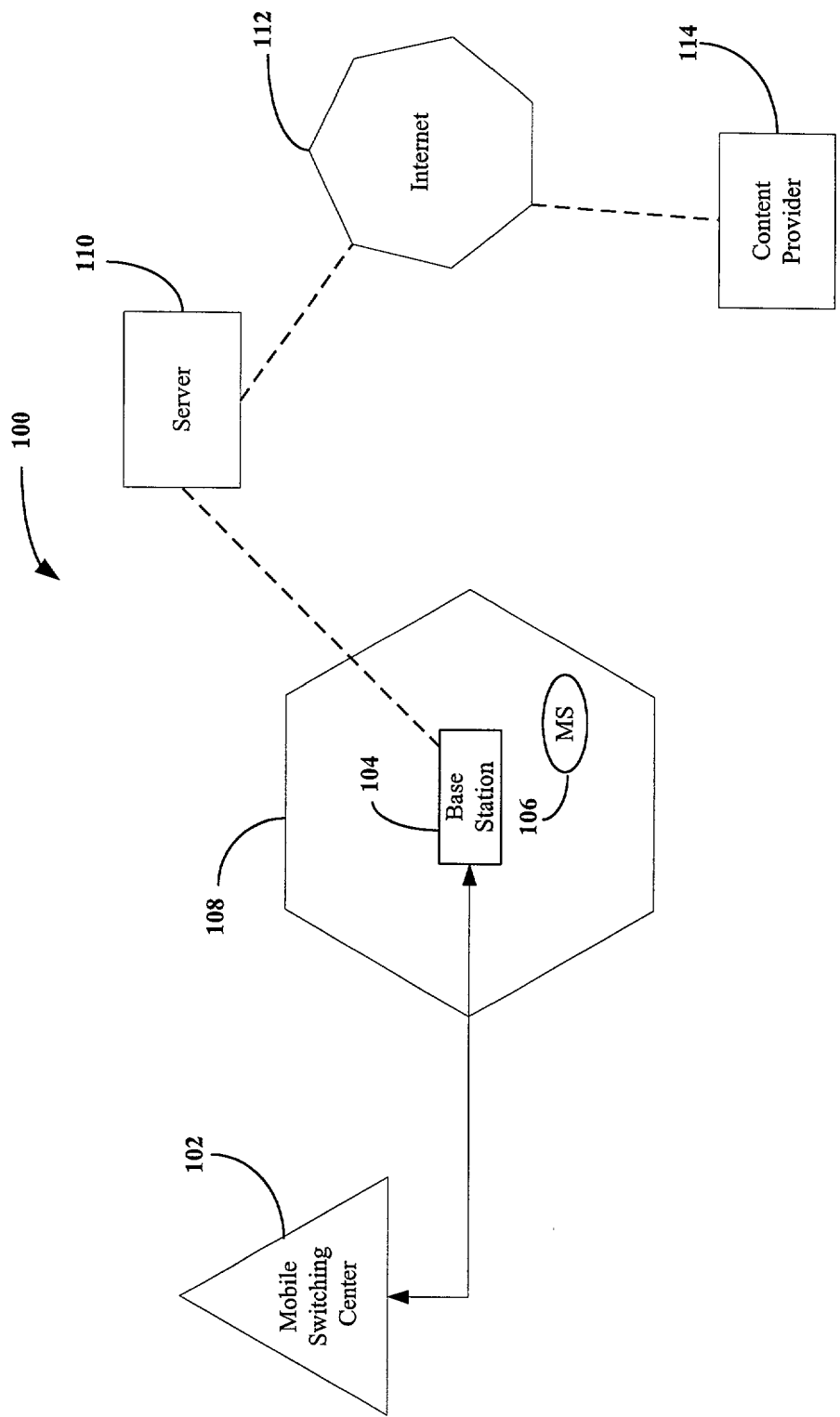
FIG. 1 illustrates components of a wireless communication system appropriate for use with an embodiment of the invention.

FIG. 1 illustrates components of a wireless communication system. A mobile switching center 102 communicates with a base station 104. The base station 104 broadcasts data to and receives data from mobile stations 106 within a cell 108. The cell 108 is a geographic region, roughly hexagonal, having a radius of up to 35 kilometers or possibly more.

The mobile station 106 is capable of receiving data from and transmitting data to a base station 104. Additional cells adjacent to the cell 108 permit mobile stations 106 to cross cell boundaries without interrupting communications. This is because base stations 104 in adjacent cells assume the task of transmitting and receiving data for the mobile stations 106. The mobile switching center 102 may coordinate all communication to and from mobile stations 106 in a multi-cell region, thus the mobile switching center 102 may communicate with many base stations 104.

A program generator and distributor contained in server 110 delivers programs, generated according to one embodiment of this invention, and containing action and context description pairs, to the mobile stations 106. The deliveries could be triggered by a request from a mobile station or simply delivered to the mobile stations at the choice of the program generator and distributor in the server 110.

The mobile stations 106 may move about freely within the cell 108 while communicating either voice or data. The mobile stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone synchronizes communication with the base station 104. The cellular telephone then registers with the mobile switching center 102 to make itself known as an active user within the wireless network.

The mobile station 106 scans data frames broadcast by the base station 104 to detect any telephone calls or paging messages directed to the cellular telephone. In this call detection mode, the mobile station 106 receives, stores and examines paging message data, and determines whether the data contains an identifier matching an identifier of the mobile station 106. If a match is detected, the mobile station 106 establishes a call with the mobile switching center 102 via the base station 104. If no match is detected, the mobile station 106 enters an idle state for a predetermined period of time, then exits the idle state to receive another transmission of paging message data.

Figure 2:
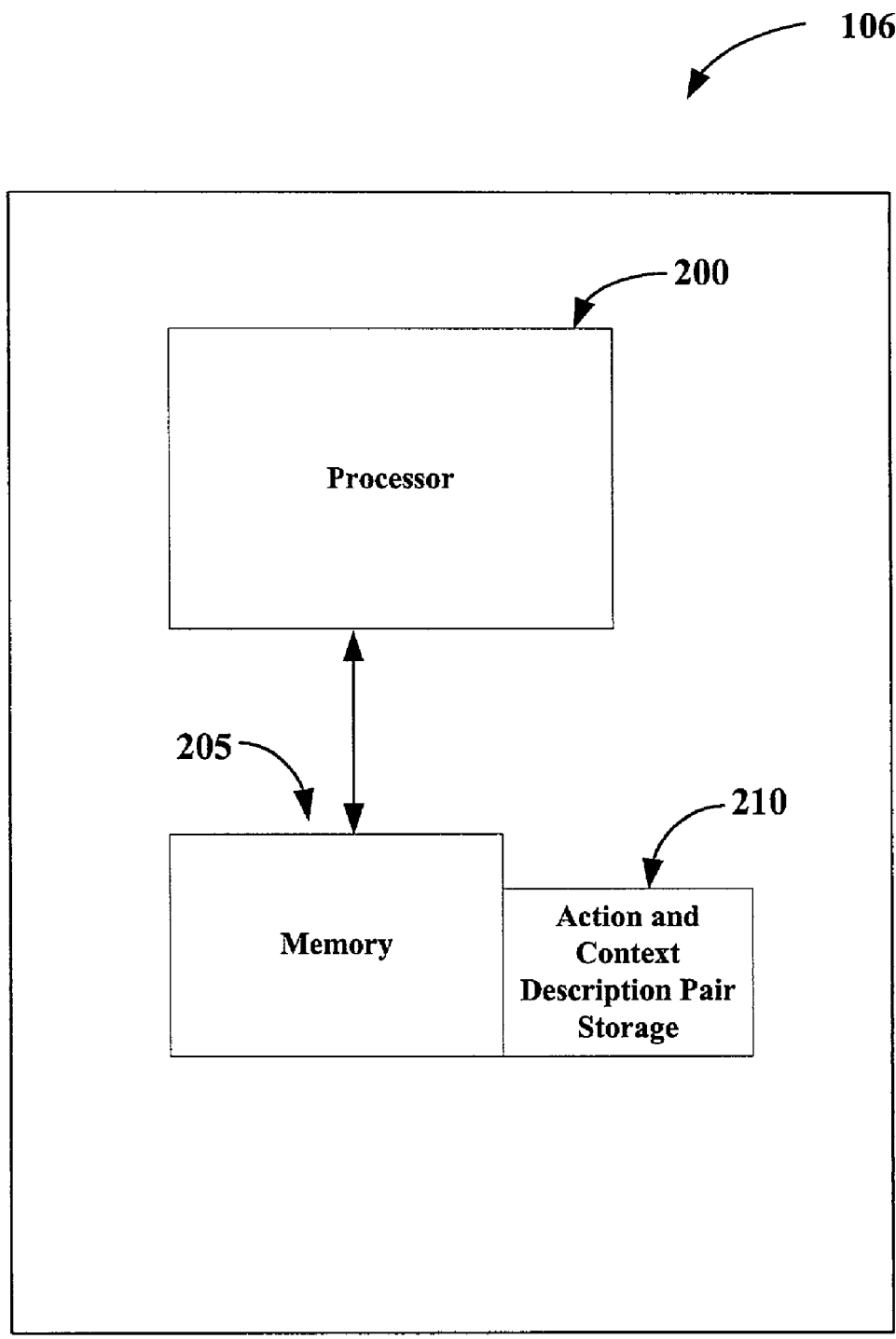
FIG. 2 is a block diagram showing features of a mobile station according to one embodiment of the invention.

FIG. 2 shows a block diagram of the mobile station 106 and the processing that occurs in that mobile station 106. The processor 200 is driven by a program stored in a memory 205. Contextual information and associated instructions for the mobile station 106 may also be stored in another part of memory shown here as 210. The memory 205 stores various conditions including information obtained from searches to base stations.

Figure 3:
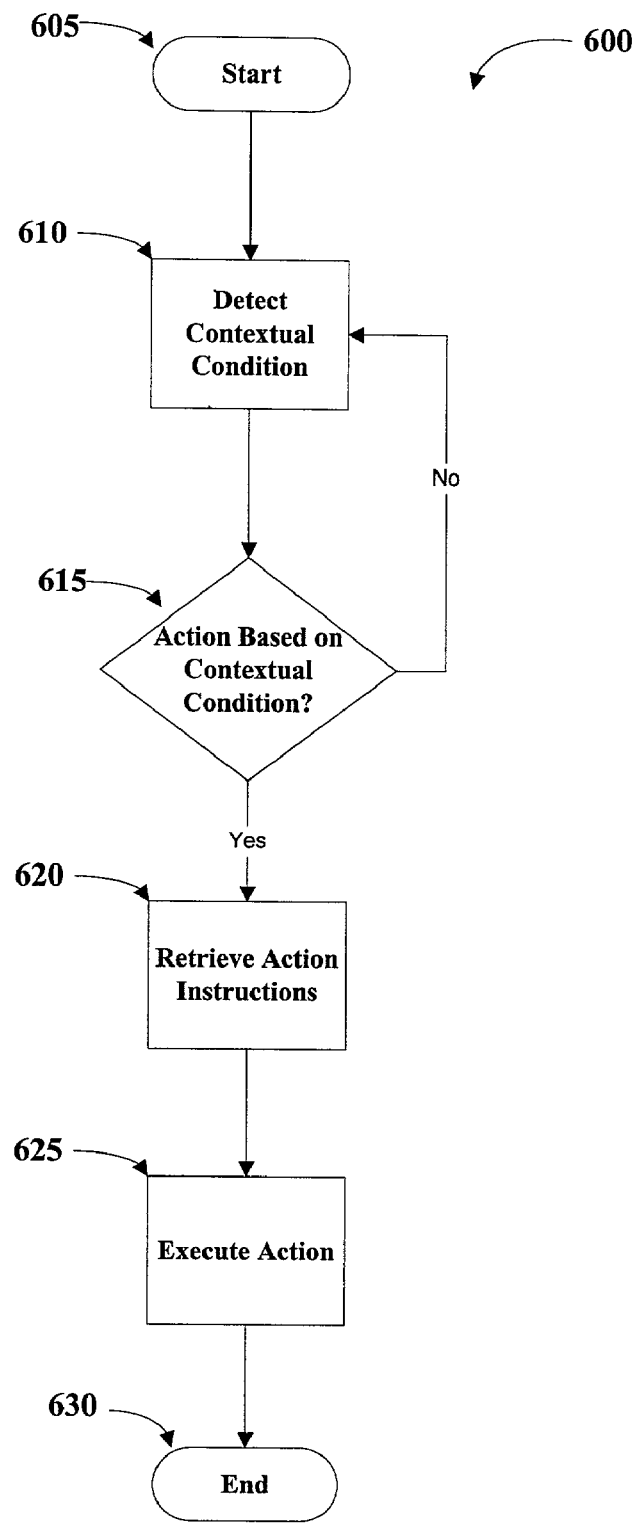
FIG. 3 illustrates a process for using the contextual conditions in a program according to one embodiment of the present invention.

FIG. 3 illustrates a process 600 according to one embodiment for using the context information 305 to trigger execution of actions generated according to one embodiment of the present invention. The process 600 begins in START block 605. Proceeding to block 610, the mobile station 106 detects if a contextual condition is satisfied. The contextual condition may be identified by a context description. For example, the contextual condition may be that the user is arriving at a particular location, such as the office. The mobile station may monitor positioning systems to determine when the contextual condition is satisfied.

Proceeding to block 615, the mobile station 106 determines if any action is necessary based on the contextual conditions. For example, the user may desire the mobile station 106 to place a call to a voice mail system upon arrival at the office. The mobile station 106 matches the satisfied contextual condition with a desired action. Other examples of actions are retrieving a web page, powering down the mobile station, executing a program, requesting information, reset user preferences, or any other desired actions.

Proceeding to block 620, the mobile station 106 retrieves the action instructions. The instructions may be retrieved from a wireless web browser, from the wireless service provider, or may be stored within the mobile station. The action instructions may be generated manually or automatically by a server or other entity that has a wealth of contextual information such as geographical information databases, network databases, user profile database, and others. The instructions encapsulate detection of context and execution of associated actions so that that context information is kept private to the user. For example, when the mobile detects it is near a mall, it retrieves an advertisement from a URL while no private location information is disclosed.

The server 110 that generates the instructions may translate application requirements into programs either manually or automatically. The instructions contain action and context description pairs where the action is executed when the context description is satisfied. In the process, or independently, the entity may monitor the generation of such programs to determine if external actions that may result from detection of certain context conditions implicitly disclose certain private information. This may be done with a simple comparison of how many different contexts or conditions result in the same external action (external refers to external to the mobile such as a web-page access). If the number is small or only one, then the action implicitly gives up private information. For example, if only one very strictly defined location context results in the access of a specific 3rd party URL, then this could be flagged as potentially dangerous to the user of the mobile device or the application request could be rejected. Alternatively, the program may be re-written or modified such that the implicit disclosure of private information is reduced or eliminated. For example, the entity may generate additional contexts with the same action to artificially mask the private information.

Proceeding to block 625, the mobile station 106 executes the action instructions. The action instructions may be persistent programs that are stored in the mobile terminal or peripheral equipment. In this way, the context-based monitoring is split between server and mobile to maintain a desired level of precision, accuracy, privacy, resource utilization (distributed processing), air-link usage, etc. The programs may be executed upon download such as XML or WML pages. The programs may be a combination of these pages, and may also use extended capabilities of the wireless terminal to perform trigger checks and execute actions. The programs may be paired so that related programs execute on both the mobile station 106 and a server. These programs may communicate with each other, and the programs may be generated by another program. The server program may also broker multiple context-sensitive applications. For example, if a third party advertising firm wants to send advertisements to a mobile station, then the server may manage and schedule the different requests appropriately. Thus, if the mobile station 106 satisfies a contextual condition that states the mobile station 106 is approaching a mall, the third party advertiser may send an ad for a store at the mall, but not know exactly where the mobile station 106 is located when the ad is being delivered. After the program is executed, the process terminates in END block 630.

For some applications and services such as advertising, it is desirable to collect statistics. While the user's privacy is protected, the collection of statistical information may be complicated. However, with this invention, the programs can also include actions to collect statistics themselves and automatically inform a server or other entity of a number of "hits" that occurred. The mobile may do so anonymously by sending a mobile originated SMS or other anonymous URL post.

The generation of programs may also be dependent on user profile information that is provided to or stored at a server. The parameters of generation of programs may depend on certain user specified information or parameters specified by usage, purchase, ownership or membership, etc. For example, parameters may include:

Allow/disallow push delivery

Specify privacy levels of various context information (location, time, etc)

Allow/disallow history collection

Allow/disallow network access for specific purposes

Specify levels of allowances/disallowances

Age, preferences, history, identity

Anonymity: each access anonymous or anonymous but identified as the same user as before.

Application or services allowed to use information: Emergency only, bearer service only (ex: system selection only), local applications vs. remote applications.

The programs described in this invention use building blocks that support detection of various contextual conditions and combinations thereof. The following building blocks are examples:

Transitional/orientational conditions: before arriving at a location, after leaving a location, upon arriving at a location, or a combination thereof.

Delay conditions: after a specific period of time has passed since a transition occurred either of the same type, the same transition exactly, reversed, related or unrelated in some particular way.

Range conditions: after having traveled at least some distance from some other location or context.

Dynamic conditions: while stationary for a period if time, while traveling within a given speed range or set of ranges of speeds or at a specific speed or set of specified speeds.

Directional conditions: while moving in a specific direction or range or set of directions.

Precision/accuracy conditions: location is known precisely or not, accurately or not, within specified precisions or accuracies.

Sensitivity/integrity/risk conditions: location is known to be accurate with a certain probability or the location is known to be within some range with a certain probability or set of ranges with some associated probability distribution.

Recurrence conditions: after having occurred a number of times or more or less than a specific number of times or the occurrence is a multiple of some number (example: every 5th occurrence) or other pattern.

Schedule/time conditions: at a specific time, range of times, dates, days, day(s) of the week, month, year, etc.

Bearer conditions: with certain defined signal conditions or range or set of signal conditions or available capabilities or resources.

Terminal state or status or mode: user profile, mode of usage, business or personal, happy or sad, mood, personality. Also, terminal processing load, interruption allowance (can another call or activity be interrupted), etc.

Numerous variations and modifications of the invention will become readily apparent to those skilled in the art. Accordingly, the invention may be embodied in other specific forms without departing from its spirit or essential characteristics.

What is claimed is:

1. A method of restricting distribution of an action and context description pair to avoid inherently disclosing private context associated with the action, to a third party that has access to association of the action and the content description, due to fulfilling said action, comprising:
   determining a number of potential users that may encounter a context condition that may satisfy said context description; and
   checking if the number of potential users that may encounter the context condition that may satisfy said context description exceeds a limit.

2. The method of claim 1, further comprising rejecting said action and context description pair if said limit is not exceeded and otherwise accepting said action and context description pair.

3. The method of claim 1, wherein said step of determining the number of potential users that may encounter the context condition that may satisfy the context description includes determining the number of users whose context may satisfy the context description in the future.

4. The method of claim 1, wherein said step of determining the number of potential users that may encounter the context condition that may satisfy the context description includes determining the number of locations that may satisfy the context description in the future.

5. The method of claim 1, further comprising sending a privacy alert to the user it said limit is not exceeded and said action may implicitly disclose private context information if executed.

6. The method of claim 1, further comprising modifying said context description of said pair if said limit is not exceeded to expand the number of potential users that may encounter the context condition which satisfy the context description.

7. The method of claim 1, further comprising generating additional context descriptions for said action so that said pair is associated with a larger number of context conditions and thereby masking an originally requested action and context description pair.

8. The method of claim 1, wherein the action associated with said action and context description pair is selected from the group consisting of delivering content to a user, making a call, sending a short message, executing a program, executing a script, starting a tracking activity, retrieving a web page, posting to a URL (Uniform Resource Locator), downloading a program, downloading a script, downloading parameters, and downloading arguments for a program.

9. The method of claim 1, wherein the action associated with said action and context description pair is performed with user consent.

10. The method of claim 1, wherein the action associated with said action and context description pair is performed without user consent.

11. The method of claim 1, wherein the action associated with said action and context description pair is performed with user knowledge.

12. The method of claim 1, wherein the action associated with said action and context description pair is performed without user knowledge.

13. The method of claim 1, wherein the context description associated with said action and context description pair includes a description of a condition characteristic selected from the group consisting of a location, geographical area, time, date, schedule, usage mode, mobile state, mobile status, signal conditions, processor load, memory availability, proximity to a location, speed, direction of travel, usage history, user profile, a status of another user terminal, and a current context of another user terminal.

14. The method of claim 1, further comprising monitoring by a mobile station said mobile station's current context with respect to the context description associated with said action and context description pair and executing said action upon detecting that the current context of said mobile station satisfies said context description.

15. The method of claim 14, wherein said monitoring occurs when an event selected from the group consisting of periodically, upon detecting a current context change, and upon user initiated action, occurs.

16. The method of claim 1, further comprising sending said action and context description pair to a plurality of mobile stations.

17. The method of claim 1, wherein the context description associated with said action and context description pair is implemented in the form selected from the group consisting of a program, a script, and a parametric description.

18. A method of restricting distribution of an action and context description pair to avoid inherently disclosing private context associated with the action, to a third party has access to association of the action and the content description, due to fulfilling said action, comprising:
   monitoring the generation of said action and context description pair;
   computing the broadness of said context description;
   searching for context conditions which satisfy said context description;
   counting a number of potential users that may encounter the context condition that may satisfy said context description; and
   checking if the number of potential users that may encounter the context condition that may satisfy said context description exceeds a limit.

19. The method of claim 18, further comprising modifying said context description of said pair if said limit is not exceeded to expand the number of context conditions which satisfy the context description.

20. The method of claim 18, further comprising rejecting said action and context description pair it said limit is not exceeded and otherwise accepting said action and context description pair.

21. The method of claim 18, further comprising generating additional context descriptions for said action so that said pair is associated with a larger number of context conditions and thereby masking an originally requested action and context description pair.

22. The method of claim 18, wherein said step of determining the number of potential users that may encounter the context condition that may satisfy a context description includes determining the number of users whose context may satisfy the context description in the future.

23. The method of claim 18, wherein said step of determining the number of potential users that may encounter the context condition that may satisfy a context description includes determining the number of locations that may satisfy the context description in the future.

24. The method of claim 18, further comprising sending a privacy alert to the user if said limit is not exceeded and said action may implicitly disclose private context information if executed.

25. The method of claim 18, wherein the action associated with said action and context description pair is selected from the group consisting of delivering content to a user, making a call, sending a short message, executing a program, executing a script, starting a tracking activity, retrieving a web page, posting to a URL (Uniform Resource Locator), downloading a program, downloading a script, downloading parameters, and downloading arguments for a program.

26. The method of claim 18, wherein the action associated with said action and context description pair is performed with user consent.

27. The method of claim 18, wherein the action associated with said action and context description pair is performed without user consent.

28. The method of claim 18, wherein the action associated with said action and context description pair is performed with user knowledge.

29. The method of claim 18, wherein the action associated with said action and context description pair is performed without user knowledge.

30. The method of claim 18, wherein the context description associated with said action and context description pair includes a description of a condition characteristic selected from the group consisting of a location, geographical area, time, date, schedule, usage mode, mobile state, mobile status, signal conditions, processor load, memory availability, proximity to a location, speed, direction of travel, usage history, user profile, a status of another user terminal, and a current context of another user terminal.

31. The method of claim 18, further comprising monitoring by a mobile station said mobile station's current context with respect to the context description associated with said action and context description pair and executing said action upon detecting that the current context of said mobile station satisfies said context description.

32. The method of claim 31, wherein said monitoring occurs when an event selected from the group consisting of periodically, upon detecting a current context change, and upon user initiated action, occurs.

33. The method of claim 18, further comprising sending said action and context description pair to a plurality of mobile stations.

34. The method of claim 18, wherein the context description associated with said action and context description pair is implemented in the form selected from the group consisting of a program, a script, and a parametric description.

35. The method of claim 18, wherein the action and context description pair is obtained from the wireless web.

36. The method of claim 18, wherein the action and context description pair is obtained from memory.

37. A mobile station for utilizing a plurality of actions and context description pairs, in a wireless telecommunications network, comprising:
a memory which stores the plurality of action and context description pairs; and
a processor which determines when the context description portion of one of the plurality of action and context descriptor pairs is satisfied and subsequently performs the corresponding action;
wherein the plurality of action and context description pairs are generated by generating means for determining a number of potential users that may encounter a context condition that may satisfy the context description and for checking if the number of potential users that may encounter the context condition that may satisfy the context description exceeds a limit.

38. The mobile station of claim 37, wherein said generating means further comprises means for rejecting said action and context description pair if said number of context conditions that may be satisfied exceeds said limit.

39. The mobile station of claim 37, wherein said generating means further comprises means for determining the number of users whose context may satisfy the context description in the future.

40. The mobile station of claim 37, wherein said generating means further comprises means for determining the number of locations that may satisfy the context description in the future.

41. The mobile station of claim 37, wherein said generating means further comprises sending a privacy alert to the user if said limit is not exceeded and said action may implicitly disclose private context information if executed.

42. The mobile station of claim 37, wherein said generating means further comprises modifying said context description of said pair if said limit is not exceeded to expand the number of context conditions which satisfy the context description.

43. The mobile station of claim 37, wherein said generating means further comprises generating additional context descriptions for said action so that said pair is associated with a larger number of context conditions and thereby masking an originally requested action and context description pair.

44. The mobile station of claim 37, further comprising a selector to select the action associated with said action and context description pair from the group consisting of delivering content to a user, making a call, sending a short message, executing a program, executing a script, starting a tracking activity, retrieving a web page, posting to a URL (Uniform Resource Locator), downloading a program, downloading a script, downloading parameters, and downloading arguments for a program.

45. The mobile station of claim 37, wherein said mobile station further comprises obtaining user consent for the action associated with said action and context description pair.

46. The mobile station of claim 37, wherein said mobile station further comprises informing the user of the action associated with said action and context description pair when it is performed.

47. The mobile station of claim 37, wherein the context description associated with said action and context description pair includes a description of a condition characteristic selected from the group consisting of a location, geographical area, time, date, schedule, usage mode, mobile state, mobile status, signal conditions, processor load, memory availability, proximity to a location, speed, direction of travel, usage history, user profile, a status of another user terminal, and a current context of another user terminal.

48. The mobile station of claim 37, wherein said mobile station further comprises a monitor for monitoring said mobile station's current context with respect to the context description associated with said action and context description pair and executing said action upon detecting that the current context of said mobile station satisfies said context description.

49. The mobile station of claim 48, wherein said monitor further comprises checking context conditions when an event selected from the group consisting of periodically, upon detecting a current context change, and upon user initiated action, occurs.

50. The mobile station of claim 37, further comprising a distributor sends said action and context description pair to a plurality of mobile stations.

51. The mobile station of claim 37, wherein the context description associated with said action and context description pair is implemented in the form selected from the group consisting of a program, a script, and a parametric description.

52. A server for processing of a plurality of actions and context description pairs, in a wireless telecommunications network, comprising:
a memory which stores the plurality of action and context description pairs; and
a processor for determining a number of potential users that may encounter a context condition that may satisfy the context description and for checking if the number of potential users that may encounter the context conditions that may satisfy the context description exceeds a limit.

53. The server of claim 52, further comprising a monitor which determines when the context description portion of one of the plurality of action and context descriptor pairs is satisfied and subsequently performs the corresponding action.

54. The server of claim 52, further comprising a receiver to receive requests to deliver context-based content and instructions.

55. The server of claim 52, further comprising a distributor to send said action and context description pairs to a plurality of mobile stations.

56. The server of claim 52, wherein said processor further comprises means for rejecting said action and context description pair if said limit is not exceeded and otherwise accepting said action and context description pair.

57. The server of claim 52, wherein said processor further comprises means for determining the number of context conditions that may satisfy a context description includes determining the number of users whose context may satisfy the context description in the future.

58. The server of claim 52, wherein said processor further comprises means for determining the number of context conditions that may satisfy a context description includes determining the number of locations that may satisfy the context description in the future.

59. The server of claim 52, wherein said processor further comprises means for sending a privacy alert to the user if said limit is not exceeded and said action may implicitly disclose private context information if executed.

60. The server of claim 52, wherein said processor further comprises means for modifying said context description of said pair if said limit is not exceeded to expand the number of context conditions which satisfy the context description.

61. The server of claim 52, wherein said processor further comprises means for generating additional context descriptions for said action so that said pair is associated with a larger number of context conditions and thereby masking an originally requested action and context description pair.

62. The server of claim 52, wherein the action associated with said action and context description pair is selected from the group consisting of delivering content to a user, making a call, sending a short message, executing a program, executing a script, starting a tracking activity, retrieving a web page, posting to a URL (Uniform Resource Locator), downloading a program, downloading a script, downloading parameters, and downloading arguments for a program.

63. The server of claim 52, wherein the context description associated with said action and context description pair includes a description of a condition characteristic selected from the group consisting of a location, geographical area, time, date, schedule, usage mode, mobile state, mobile status, signal conditions, processor load, memory availability, proximity to a location, speed, direction of travel, usage history, user profile, a status of another user terminal, and a current context of another user terminal.

64. The server of claim 53, wherein said monitor executes when an event selected from the group consisting of periodically, upon detecting a current context change, and upon user initiated action, occurs.

65. The server of claim 52, wherein the context description associated with said action and context description pair is implemented in the form selected from the group consisting of a program, a script, and a parametric description.

66. A system for distribution of an action and context description pair to control disclosure of private information due to executing said action, comprising:
a server to monitor the generation of said action and context description pair, to search for context conditions that satisfy the context description, to count a number of potential users that may encounter context conditions pairs that may satisfy the context description and to check if the number of potential users that may encounter the context conditions that may satisfy the context description exceeds a limit; and
a mobile station including means for receiving said action and context description pair.

67. The system of claim 66, wherein said server further comprises a means for rejecting said action and context description pair if said limit is not exceeded and otherwise accepting said action and context description pair.

68. The system of claim 66, wherein said mobile station further comprises a means for rejecting said action and context description pair if said limit is not exceeded and otherwise accepting said action and context description pair.

69. The system of claim 66, wherein said server further comprises a means for determining the number of context conditions that may satisfy a context description includes determining the number of users whose context may satisfy the context description in the future.

70. The system of claim 66, wherein said server further comprises a means of determining the number of context conditions that may satisfy a context description includes determining the number of locations that may satisfy the context description in the future.

71. The system of claim 66, wherein said server further comprises a means to send a privacy alert to the user if said limit is not exceeded and said action may implicitly disclose private context information if executed.

72. The system of claim 66, wherein said server further comprises a control to modify said context description of said pair if said limit is not exceeded to expand the number of potential users that may encounter the context conditions which satisfy the context description.

73. The system of claim 66, wherein said server further comprises a processor to generate additional context descriptions for said action so that said pair is associated with a larger number of context conditions and thereby masking an originally requested action and context description pair.

74. The system of claim 66, wherein the action associated with said action and context description pair is selected from the group consisting of delivering content to a user, making a call, sending a short message, executing a program, executing a script, starting a tracking activity, retrieving a web page, posting to a URL (Uniform Resource Locator), downloading a program, downloading a script, downloading parameters, and downloading arguments for a program.

75. The system of claim 66, wherein the mobile station further comprises a processor to execute the action associated with said action and context description pair with user consent.

76. The system of claim 66, wherein the mobile station further comprises a processor to execute the action associated with said action and context description pair without user consent.

77. The system of claim 66, wherein the mobile station further comprises a processor to execute the action associated with said action and context description pair is performed with user knowledge.

78. The system of claim 66, wherein the mobile station further comprises a processor to execute the action associated with said action and context description pair is performed without user knowledge.

79. The system of claim 66, wherein the context description associated with said action and context description pair includes a description of a condition characteristic selected from the group consisting of a location, geographical area, time, date, schedule, usage mode, mobile state, mobile status, signal conditions, processor load, memory availability, proximity to a location, speed, direction of travel, usage history, user profile, a status of another user terminal, and a current context of another user terminal.

80. The system of claim 66, wherein said mobile station further comprises a monitor to monitor said mobile station's current context with respect to the context description associated with said action and context description pair and executing said action upon detecting that the current context of said mobile station satisfies said context description.

81. The system of claim 80, wherein said monitor further executes said action when an event selected from the group consisting of periodically, upon detecting a current context change, and upon user initiated action, occurs.

82. The system of claim 66, wherein said server further comprises a distributor to send said action and context description pair to a plurality of mobile stations.

83. The system of claim 66, wherein the context description associated with said action and context description pair is implemented in the form selected from the group consisting of a program, a script, and a parametric description.

* * * * *